United States Patent
Dai et al.

(10) Patent No.: US 9,924,484 B2
(45) Date of Patent: Mar. 20, 2018

(54) NETWORK REGISTRATION METHOD AND APPARATUS, AND MOBILE TERMINAL

(71) Applicant: Huawei Technologies Co., Ltd., Shenzhen (CN)

(72) Inventors: Bei Dai, Wuhan (CN); Xiaojian Liu, Wuhan (CN); Li Shen, Beijing (CN); Yinqing Jiang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/312,294

(22) PCT Filed: May 20, 2014

(86) PCT No.: PCT/CN2014/077890
§ 371 (c)(1),
(2) Date: Nov. 18, 2016

(87) PCT Pub. No.: WO2015/176231
PCT Pub. Date: Nov. 26, 2015

(65) Prior Publication Data
US 2017/0078999 A1    Mar. 16, 2017

(51) Int. Cl.
*H04W 48/18* (2009.01)
*H04W 60/00* (2009.01)
(Continued)

(52) U.S. Cl.
CPC ............ *H04W 60/00* (2013.01); *H04W 48/18* (2013.01); *H04W 48/20* (2013.01); *H04W 8/06* (2013.01); *H04W 48/16* (2013.01); *H04W 88/02* (2013.01)

(58) Field of Classification Search
CPC ...... H04W 48/18; H04W 60/00; H04W 48/20; H04W 88/02; H04W 48/16; H04W 8/06
(Continued)

(56) References Cited

U.S. PATENT DOCUMENTS

2002/0183061 A1* 12/2002 Moore ................. H04W 36/06
                                                               455/434
2006/0068782 A1*  3/2006 Kuriyama ............ H04W 48/16
                                                               455/434
(Continued)

FOREIGN PATENT DOCUMENTS

CN         1756435 A       4/2006
CN       101227204 A       7/2008
(Continued)

OTHER PUBLICATIONS

Machine Translation and Abstract of Chinese Publication No. CN101827429, dated Sep. 8, 2010, 4 pages.
(Continued)

*Primary Examiner* — Nathan Taylor
(74) *Attorney, Agent, or Firm* — Conley Rose, P.C.

(57) ABSTRACT

A network registration method and apparatus, and a mobile terminal are presented. During re-registration with a network, after receiving a channel allocation rejection message sent by the network, a mobile terminal sorts all available frequency channels according to network resource statuses of frequency channels with which network registration failed before and that are in a low priority list. And then the mobile terminal tries to camp on all the available frequency channels according to an order of the sorting to determine a frequency channel to be camped on. The mobile terminal sends a network registration message to register with the frequency channel to be camped on.

16 Claims, 7 Drawing Sheets

(51) Int. Cl.
*H04W 48/20* (2009.01)
*H04W 88/02* (2009.01)
*H04W 8/06* (2009.01)
*H04W 48/16* (2009.01)

(58) Field of Classification Search
USPC .................................................... 455/435.3
See application file for complete search history.

(56) References Cited

U.S. PATENT DOCUMENTS

| | | | | |
|---|---|---|---|---|
| 2007/0004405 | A1* | 1/2007 | Buckley | H04W 48/18 455/434 |
| 2009/0070406 | A1* | 3/2009 | Terpstra | H04L 29/125 709/203 |
| 2009/0221283 | A1* | 9/2009 | Soliman | H04W 48/14 455/426.1 |
| 2010/0131325 | A1* | 5/2010 | Song | H04L 47/745 370/235 |
| 2010/0216465 | A1* | 8/2010 | Mubarek | H04W 48/18 455/435.1 |
| 2011/0034169 | A1* | 2/2011 | Roberts | H04W 48/18 455/435.3 |
| 2012/0243436 | A1* | 9/2012 | Hind | H04W 48/18 370/254 |
| 2013/0109377 | A1* | 5/2013 | Al-Khudairi | H04W 48/16 455/432.1 |
| 2013/0176885 | A1* | 7/2013 | Lee | H04W 36/0083 370/252 |

FOREIGN PATENT DOCUMENTS

| | | |
|---|---|---|
| CN | 101827429 A | 9/2010 |
| EP | 2114106 A1 | 11/2009 |

OTHER PUBLICATIONS

Foreign Communication From A Counterpart Application, PCT Application No. PCT/CN2014/077890, English Translation of International Search Report dated Feb. 10, 2015, 2 pages.

Foreign Communication From A Counterpart Application, PCT Application No. PCT/CN2014/077890, English Translation of Written Opinion dated Feb. 10, 2015, 7 pages.

\* cited by examiner

NETWORK REGISTRATION METHOD AND APPARATUS, AND MOBILE TERMINAL

CROSS-REFERENCE TO RELATED APPLICATIONS

This application is a National Stage of International Application No. PCT/CN2014/077890, filed on May 20, 2014, which is hereby incorporated by reference in its entirety.

TECHNICAL FIELD

Embodiments of the present disclosure relate to wireless communications technologies, and in particular, to a network registration method and apparatus, and a mobile terminal.

BACKGROUND

Currently, when registering with a network, a mobile terminal needs to go through processes such as scanning frequency channels, decoding a system broadcast message, saving a frequency channel, camping on a cell, and sending a registration message, where the process of sending a registration message further includes a process of requesting a channel and a process of registration authentication. Because a cell has limited network resources, when the cell is overloaded and the network resources are insufficient in a process of registering with a network, the network sends a channel allocation rejection message to the mobile terminal, and does not allocate a network resource to the mobile terminal, so as to reject access from the mobile terminal.

In the prior art, after receiving the channel allocation rejection message sent by the network, the mobile terminal re-initiates a process of registering with the network. For the purpose of accelerating network search, the mobile terminal preferentially scans frequency channels that are successfully decoded before, sorts, according to signal strength, cells of available frequency channels that are obtained by means of scanning, and tries the cells one by one to determine whether one cell can be camped on.

However, in the re-registration process, if signals are strong in the cell with which registration failed before and that has limited network resources, though a frequency channel with abundant network resources exists in the network, the mobile terminal still selects the cell with limited network resources to perform registration, which leads to a failure in registering the mobile terminal with the network.

SUMMARY

Embodiments of the present disclosure provide a network registration method and apparatus, and a mobile terminal, so that when re-registering with a network after receiving a channel allocation rejection message sent by the network, the mobile terminal selects a cell of a frequency channel with abundant network resources and therefore successfully registers with the network.

According to a first aspect, an embodiment of the present disclosure provides a network registration method, including sorting all available frequency channels according to a pre-stored low priority list, where the low priority list stores network resource status information of a frequency channel with which network registration failed before; trying to camp on all the available frequency channels according to an order of the sorting, so as to determine a frequency channel to be camped on; and sending a network registration message to a network to register with the frequency channel to be camped on.

In a first possible implementation manner of the first aspect, before the sorting all available frequency channels according to a pre-stored low priority list, the method further includes storing, in a network registration process, the network resource status information of the frequency channel with which network registration failed before, so as to generate the low priority list.

With reference to the first aspect or the first possible implementation manner of the first aspect, in a second possible implementation manner of the first aspect, after the sending a network registration message to a network to register with the frequency channel to be camped on, the method further includes updating the low priority list.

With reference to the second possible implementation manner of the first aspect, in a third possible implementation manner of the first aspect, before the updating the low priority list, the method further includes determining a cell to be camped on, where the cell to be camped on is a cell that has a strongest access capability in cells belonging to the frequency channel to be camped on; and camping on the cell to be camped on.

With reference to the second or the third possible implementation manner of the first aspect, in a fourth possible implementation manner of the first aspect, the updating the low priority list includes, if registration with the frequency channel to be camped on succeeds, determining whether a frequency channel superiority factor of the frequency channel to be camped on is recorded in the low priority list, and if the frequency channel superiority factor of the frequency channel to be camped on is recorded, updating the frequency channel superiority factor of the frequency channel to be camped on; or if registration with the frequency channel to be camped on does not succeed, determining whether a frequency channel superiority factor of the frequency channel to be camped on is recorded in the low priority list; and if the frequency channel superiority factor of the frequency channel to be camped on is recorded, updating the frequency channel superiority factor of the frequency channel to be camped on, or if the frequency channel superiority factor of the frequency channel to be camped on is not recorded, inserting the frequency channel superiority factor of the frequency channel to be camped on into the low priority list, where the frequency channel superiority factor indicates a network resource status of the frequency channel.

With reference to the third possible implementation manner of the first aspect, in a fifth possible implementation manner of the first aspect, the updating the low priority list includes, if registration with the cell to be camped on succeeds, determining whether a cell access factor of the cell to be camped on is recorded in the low priority list, where the cell access factor indicates an access capability of the cell, and if the cell access factor of the cell to be camped on is recorded, updating the cell access factor of the cell to be camped on; or if registration with the cell to be camped on does not succeed, determining whether a cell access factor of the cell to be camped on is recorded in the low priority list; and if the cell access factor of the cell to be camped on is recorded, updating the cell access factor of the cell to be camped on, or if the cell access factor of the cell to be camped on is not recorded, inserting the cell access factor of the cell to be camped on into the low priority list.

With reference to the fourth possible implementation manner of the first aspect, in a sixth possible implementation manner of the first aspect, the method further includes determining whether an updated frequency channel superiority factor of the frequency channel to be camped on is greater than a first threshold, and if the updated frequency channel superiority factor is greater than the first threshold, deleting information about the frequency channel to be camped on from the low priority list, where the first threshold indicates a value of the frequency channel superiority factor when the network resource status of the frequency channel is good.

With reference to the fifth possible implementation manner of the first aspect, in a seventh possible implementation manner of the first aspect, the method further includes determining whether an updated cell access factor of the cell to be camped on is greater than a second threshold, and if the updated cell access factor is greater than the second threshold, deleting information about the cell to be camped on from the low priority list, where the second threshold indicates a value of the cell access factor when the access capability of the cell is good.

According to a second aspect, an embodiment of the present disclosure provides a network registration apparatus, including a sorting module configured to sort all available frequency channels according to a pre-stored low priority list, where the low priority list stores network resource status information of a frequency channel with which network registration failed before; a determining module configured to try to camp on all the available frequency channels according to an order of the sorting that is obtained by the sorting module, so as to determine a frequency channel to be camped on; and a sending module configured to send a network registration message to a network to implement registration with the frequency channel to be camped on that is determined by the determining module.

In a first possible implementation manner of the second aspect, the apparatus further includes a generation module configured to store, in a network registration process and before the sorting module sorts all available frequency channels according to the pre-stored low priority list, the network resource status information of the frequency channel with which network registration failed before, so as to generate the low priority list.

With reference to the second aspect or the first possible implementation manner of the second aspect, in a second possible implementation manner of the second aspect, the apparatus further includes an updating module configured to, after the sending module sends the network registration message to the network to implement registration with the frequency channel to be camped on, update the low priority list.

With reference to the second possible implementation manner of the second aspect, in a third possible implementation manner of the second aspect, the apparatus further includes a camping module, and the determining module is further configured to, before the updating module updates the low priority list, determine the cell to be camped on, where the cell to be camped on is a cell that has a strongest access capability in cells belonging to the frequency channel to be camped on; where the camping module is configured to camp on the cell to be camped on that is determined by the determining module.

With reference to the second or the third possible implementation manner of the second aspect, in a fourth possible implementation manner of the second aspect, the apparatus further includes a judging module configured to, if registration with the frequency channel to be camped on succeeds, determine whether a frequency channel superiority factor of the frequency channel to be camped on is recorded in the low priority list, where the frequency channel superiority factor indicates a network resource status of the frequency channel, and the updating module is specifically configured to, if the judging module determines that the frequency channel superiority factor of the frequency channel to be camped on is recorded in the low priority list, update the frequency channel superiority factor of the frequency channel to be camped on; or if registration with the frequency channel to be camped on does not succeed, the judging module is configured to determine whether a frequency channel superiority factor of the frequency channel to be camped on is recorded in the low priority list, where the frequency channel superiority factor indicates a network resource status of the frequency channel; and the updating module is specifically configured to, if the judging module determines that the frequency channel superiority factor of the frequency channel to be camped on is recorded in the low priority list, update the frequency channel superiority factor of the frequency channel to be camped on, or if the frequency channel superiority factor of the frequency channel to be camped on is not recorded, insert the frequency channel superiority factor of the frequency channel to be camped on into the low priority list.

With reference to the third possible implementation manner of the second aspect, in a fifth possible implementation manner of the second aspect, the apparatus further includes a judging module configured to, if registration with the cell succeeds, determine whether a cell access factor of the cell to be camped on is recorded in the low priority list, where the cell access factor indicates an access capability of the cell, and if the judging module determines that the cell access factor of the cell to be camped on is recorded in the low priority list, the cell access factor of the cell to be camped on is updated; or if registration with the cell does not succeed, the judging module determines whether a cell access factor of the cell to be camped on is recorded in the low priority list; and the updating module is specifically configured to, if the judging module determines that the cell access factor of the cell to be camped on is recorded in the low priority list, update the cell access factor of the cell to be camped on, or if the cell access factor of the cell to be camped on is not recorded, insert the cell access factor of the cell to be camped on into the low priority list.

With reference to the fourth possible implementation manner of the second aspect, in a sixth possible implementation manner of the second aspect, the judging module is further configured to determine whether an updated frequency channel superiority factor of the frequency channel to be camped on is greater than a first threshold; and the updating module is further configured to, if the judging module determines that the updated frequency channel superiority factor of the frequency channel to be camped on is greater than the first threshold, delete information about the frequency channel to be camped on from the low priority list, where the first threshold indicates a value of the frequency channel superiority factor when the network resource status of the frequency channel is good.

With reference to the fifth possible implementation manner of the second aspect, in a seventh possible implementation manner of the second aspect, the judging module is further configured to determine whether an updated cell access factor of the cell is greater than a second threshold; and the updating module is further configured to, if the judging module determines that the updated cell access factor of the cell is greater than the second threshold, delete information about the cell from the low priority list, where the second threshold indicates a value of the cell access factor when the access capability of the cell is good.

According to a third aspect, an embodiment of the present disclosure provides a mobile terminal, including a processor and a memory, where the memory stores an executable instruction; when the mobile terminal runs, the processor communicates with the memory; and the processor executes the executable instruction to enable the mobile terminal to execute the first aspect or any one of the first to the seventh possible implementation manners of the first aspect.

The embodiments of the present disclosure provide a network registration method and apparatus, and a mobile terminal. When re-registering with a network after receiving a channel allocation rejection message sent by the network, the mobile terminal sorts all available frequency channels according to network resource statuses of frequency channels with which network registration failed before and that are in a low priority list, and then tries to camp on all the available frequency channels according to an order of the sorting, so as to determine a frequency channel to be camped on, and finally sends a network registration message to register with the frequency channel to be camped on. In this method, after receiving the channel allocation rejection message sent by the network, the mobile terminal records information about a corresponding frequency channel. When the mobile terminal re-initiates the network registration, all the available frequency channels are sorted according to recorded frequency channel information, and a frequency channel with a relatively poor network resource is sorted into a low priority list, which enables the mobile terminal to preferentially select another frequency channel with a relatively good network resource to perform registration, increases a network registration success rate, and ensures reliability of a service of the mobile terminal.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
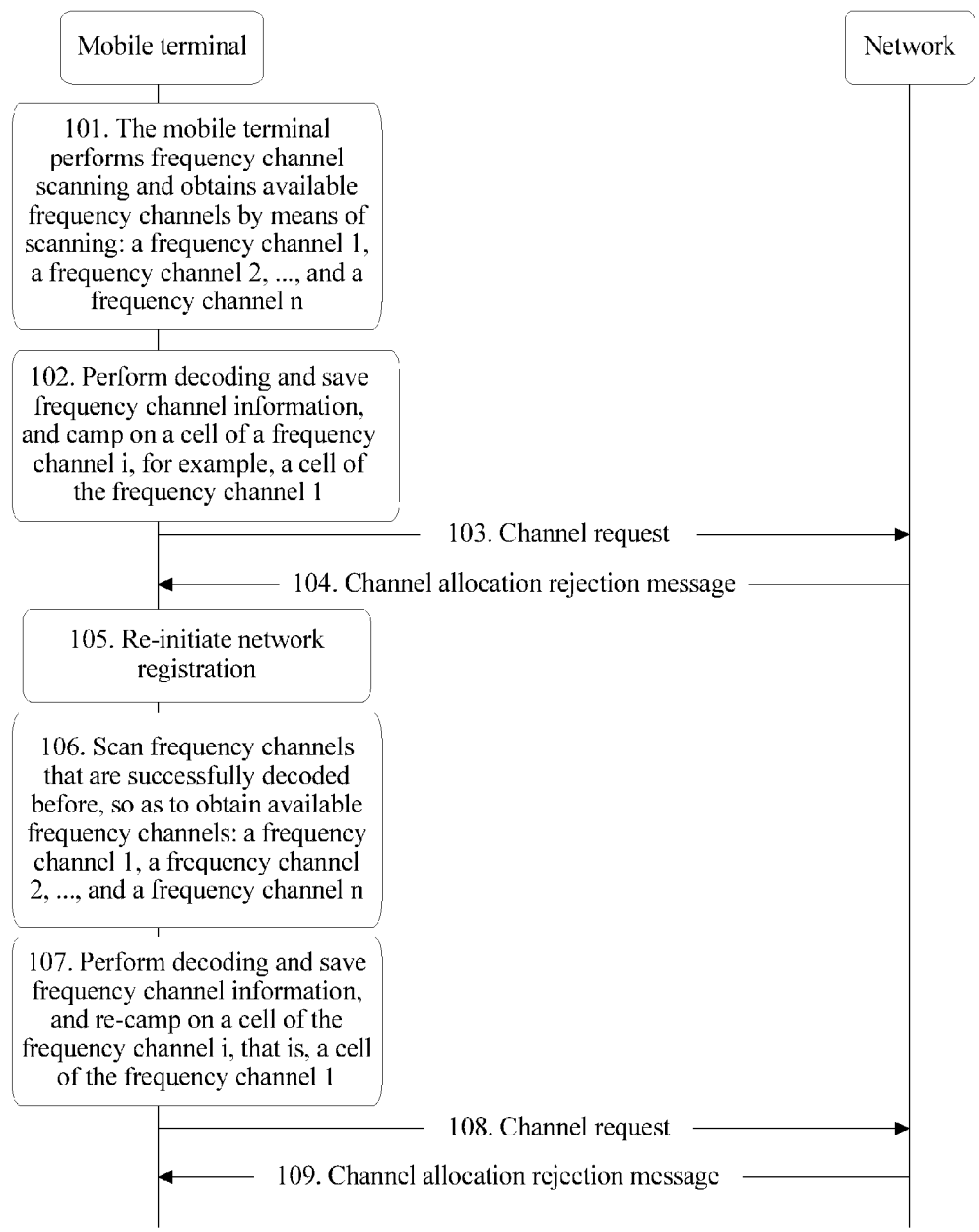
FIG. 1 is a schematic diagram of a network registration process according to the prior art.

Generally, when initially registering with a network, a mobile terminal needs to perform frequency channel scanning to find and save an available frequency channel. After receiving a channel allocation rejection message sent by the network, for the purpose of accelerating a network search, when re-selecting a frequency channel and a cell, the mobile terminal preferentially selects all saved frequency channels to perform the network registration. In this case, if cells of these frequency channels have a limited network resource but good signal strength, the mobile terminal sends a registration message to the network to request the network to allocate a network resource of the frequency channels that have a limited network resource, which leads to a failure in registering the terminal with the network, and a communication service cannot be normally performed. Specifically, reference may be made to FIG. 1. FIG. 1 is a schematic diagram of a network registration process of the prior art, where the process includes the following steps.

Step 101. The mobile terminal performs frequency channel scanning and obtains available frequency channels by means of scanning: a frequency channel 1, a frequency channel 2, . . . , and a frequency channel n.

In this step, the available frequency channels refer to frequency channels that are obtained by the mobile terminal by means of frequency channel scanning in a current network environment.

Step 102. The mobile terminal performs decoding and saves frequency channel information, and camps on a cell of a frequency channel i, for example, a cell of the frequency channel 1.

Step 103. The mobile terminal sends a channel request to a network.

Step 104. The network sends a channel allocation rejection message to the mobile terminal.

Step 105. The mobile terminal re-initiates network registration.

Step 106. The mobile terminal scans frequency channels that are successfully decoded before, so as to obtain available frequency channels: a frequency channel 1, a frequency channel 2, . . . , and a frequency channel n.

Step 107. The mobile terminal performs decoding and saves the frequency channel information, and re-camps on a cell of the frequency channel i, that is, a cell of the frequency channel 1.

Step 108. The mobile terminal sends the channel request to the network.

Step 109. The network sends a channel allocation rejection message to the mobile terminal.

In view of this, this embodiment of the present disclosure provides a network registration method, so as to resolve a problem that when re-registering with a network after receiving a channel allocation rejection message sent by a network, a mobile terminal still highly probably registers with a cell in which a frequency channel has a limited network resource. Specifically, reference may be made to FIG. 2.

Figure 2:
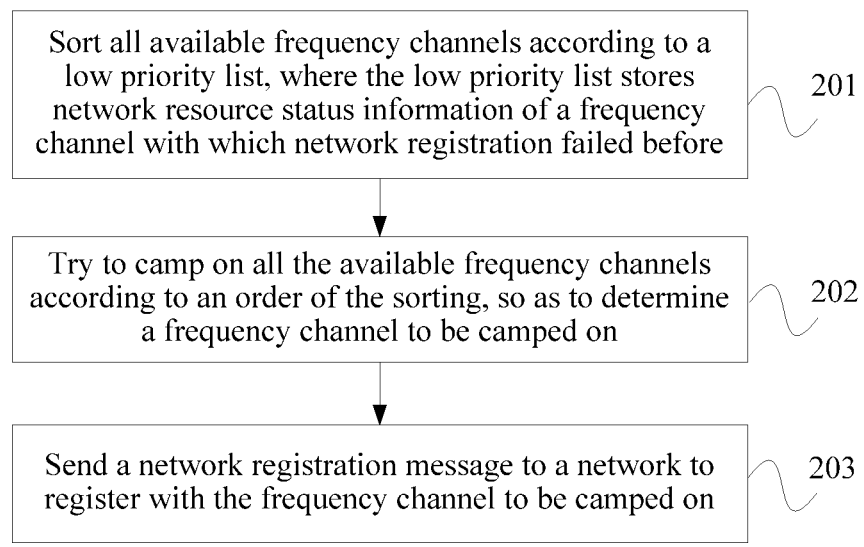
FIG. 2 is a flowchart of Embodiment 1 of a network registration method according to the present disclosure.

FIG. 2 is a flowchart of Embodiment 1 of a network registration method according to the present disclosure. This embodiment may be executed by a mobile terminal, and is applicable to a scenario in which the mobile terminal needs to successfully re-register with a network after receiving a channel allocation rejection message sent by the network. Specifically, this embodiment includes the following steps.

Step 201. Sort all available frequency channels according to a low priority list, where the low priority list stores network resource status information of a frequency channel with which network registration failed before.

In this step, the low priority list may be, for example, a database that records information about a frequency channel and a cell and that is automatically generated after the mobile terminal receives the channel allocation rejection message sent by the network, and is used to record information about a frequency channel and a cell that are related to the rejection when the mobile terminal's application for a network resource is rejected, where the information indicates a network resource status of a corresponding frequency channel. During re-registration with the network, after obtaining the available frequency channels by means of scanning, the mobile terminal sorts all the available frequency channels according to network resource statuses of frequency channels with which network registration failed before and that are recorded in the low priority list. For example, it is assumed that the available frequency channels that are obtained by means of scanning are a frequency channel 0, a frequency channel 1, a frequency channel 2, and a frequency channel 3, the frequency channel with which network registration failed before and that is recorded in the low priority list is frequency channel 0, and a network resource status of the frequency channel 0 is limited. In this case, if a network resource status of the frequency channel 1 is abundant, a network resource status of the frequency channel 2 is worse than the network resource status of the frequency channel 0, and a network resource status of the frequency channel 3 is worse than the frequency channel 1 but better than the network resource status of the frequency channel 0, all the available frequency channels are sorted as follows according to network resource statuses in descending order: the frequency channel 1→ the frequency channel 3→ the frequency channel 0→ the frequency channel 2.

In the foregoing sorting process, by default, a network resource status of an available frequency channel that is not recorded in the low priority list is generally better than a network resource status of a frequency channel that is recorded in the low priority list. In this case, if multiple frequency channels are not recorded in the low priority list, all the available frequency channels are further sorted according to signal strength. Certainly, sorting may also be performed after the network resource statuses of the available frequency channels that are not recorded in the low priority list are determined. For example, a frequency channel superiority factor that is used to indicate a network resource status of a frequency channel is determined, and all the available frequency channels are sorted according to the frequency channel superiority factor and related information superiority factor in the low priority list. For details about the frequency channel superiority factor, reference may be made to the following Table 1 and related description, and details are not described herein.

Step 202. Try to camp on all the available frequency channels according to an order of the sorting, so as to determine a frequency channel to be camped on.

After all the available frequency channels are sorted according to the network resource statuses, the mobile terminal tries to camp on all the available frequency channels according to the order of the sorting, so as to determine a frequency channel that allows the mobile terminal to camp on, that is, to determine, according to the order of the sorting, a frequency channel that allows a channel to be allocated to the mobile terminal as the frequency channel to be camped on. The foregoing example is still used. The mobile terminal first tries to camp on the frequency channel 1. If the frequency channel 1 allows the mobile terminal to camp on, the mobile terminal determines the frequency channel 1 as the frequency channel to be camped on and performs step 203. If the frequency channel 1 does not allow the mobile terminal to camp on, the mobile terminal continues to try to camp on the frequency channel 3 to check whether the frequency channel 3 can be camped on.

Step 203. Send a network registration message to a network to register with the frequency channel to be camped on.

After determining the frequency channel to be camped on that allows the mobile terminal to camp on, the mobile terminal sends the registration message to the network, that is, sends a channel request to the network, so as to request the network to allocate a channel to the mobile terminal. Then, the mobile terminal sends a registration authentication message to the network to complete the network registration.

According to the network registration method provided in this embodiment of the present disclosure, when re-registering with a network after receiving a channel allocation rejection message sent by the network, a mobile terminal sorts all available frequency channels according to network resource statuses of frequency channels with which network registration failed before and that are in a low priority list, and then tries to camp on all the available frequency channels according to an order of the sorting, so as to determine a frequency channel to be camped on, and finally sends a network registration message to register with the frequency channel to be camped on. In this method, after receiving the channel allocation rejection message sent by the network, the mobile terminal records information about a corresponding frequency channel. When the mobile terminal re-initiates the network registration, all the available frequency channels are sorted according to recorded frequency channel information, and a frequency channel with a relatively poor network resource is sorted into a low priority list, which enables the mobile terminal to preferentially select another frequency channel with a relatively good network resource to perform registration, increases a network registration success rate, and ensures reliability of a service of the mobile terminal.

Optionally, in the foregoing Embodiment 1, before sorting all the available frequency channels according to the pre-stored low priority list, the mobile terminal stores, in the network registration process, network resource status information of the frequency channels at which network registration fails, so as to generate the low priority list; or pre-evaluates a network resource of all frequency channels of a network in which the mobile terminal is located, so as to generate and store the low priority list.

Optionally, in the foregoing Embodiment 1, after sending the network registration message to the network to register with the frequency channel to be camped on, the mobile terminal may further update the low priority list, so as to make preparation for network re-registration, for example, for network registration when a cell handover is caused by movement of a terminal or the like.

According to the foregoing Embodiment 1, after camping on the frequency channel to be camped on, the mobile terminal may randomly select one cell as a cell to be camped on and access the cell; or for a specific frequency channel, a cell that belongs to the frequency channel and can be accessed by the mobile terminal may also be preset, which enables the mobile terminal to use, after determining the frequency channel to be camped on, the preset cell as the cell to be camped on; or the mobile terminal may also determine, in another manner, a specific cell to be camped on. For example, after sending the network registration message to register with the frequency channel to be camped on and before updating the low priority list, the mobile terminal may further determine a cell, which has a strongest access capability in cells belonging to the frequency channel to be camped on, as the cell to be camped on. After determining the cell to be camped on, the mobile terminal camps on the cell to be camped on. In this process, the mobile terminal first sorts, according to signal strength, all cells belonging to the frequency channel to be camped on, selects a cell with a highest signal strength as the cell to be camped on, and camps on the cell to be camped on; or sorts all the cells according to cell access factors, selects a cell with a largest cell access factor as the cell to be camped on, and camps on the cell to be camped on. In this embodiment, for description related to a cell access factor, reference may be made to the following description.

Specifically, in the foregoing Embodiment 1, a network resource of a frequency channel may be indicated using a frequency channel superiority factor. Specifically, information about a frequency channel, for example, may include information such as a frequency channel, a public land mobile network (PLMN), a location area code (LAC), a cell identifier (Cell ID), times of access success, and times of access failure. For details, reference may be made to Table 1. Table 1 is an information attribute table of a frequency channel in a network registration process according to the present disclosure.

TABLE 1

| Frequency channel | PLMN | LAC | CELL-ID | Times of access failure | Times of access success |
|---|---|---|---|---|---|
| Frequency channel 1 | PLMN1 | LAC1 | CELL-ID 1 | ... | ... |
| Frequency channel 1 | PLMN1 | LAC2 | CELL-ID 2 | ... | ... |
| ... | ... | ... | ... | ... | ... |
| ... | ... | ... | ... | ... | ... |

A cell may be uniquely identified using a cell global identifier (CGI), where the cell global identifier includes a PLMN, an LAC, and a CELL-ID. An access capability of each cell, that is, a capability of allowing the mobile terminal to register with the cell, may be indicated using a cell access factor, where the cell access factor= (times of access success)/(times of access success+ times of access failure), and a larger cell access factor indicates a stronger access capability of the cell. A network resource status, that is, a network resource insufficiency degree or a network resource abundance degree, of each frequency channel may be indicated using a frequency channel superiority factor, where the frequency channel superiority factor may be obtained by calculating cell access factors of all cells that belong to the frequency channel: the frequency channel superiority factor= (access factor of cell 1+ access factor of cell 2+. . . + access factor of cell n)/a quantity n of the cells, and a larger frequency channel superiority factor indicates a better network resource status of the frequency channel. For example, it is assumed that the available frequency channels that are obtained by means of scanning are a frequency channel 0, a frequency channel 1, a frequency channel 2, and a frequency channel 3, the frequency channel with which network registration failed before and that is recorded in the low priority list is frequency channel 0, and the frequency channel superiority factor of the frequency channel 0 is 0.5. In this case, if the frequency channel superiority factor of the frequency channel 1 is 0.9, the frequency channel superiority factor of the frequency channel 2 is 0.3, and the frequency channel superiority factor of the frequency channel 3 is 0.7, all the available frequency channels are sorted as follows according to network resource statuses in descending order: the frequency channel 1→ the frequency channel 3→ the frequency channel 0→ the frequency channel 2.

Figure 3A:
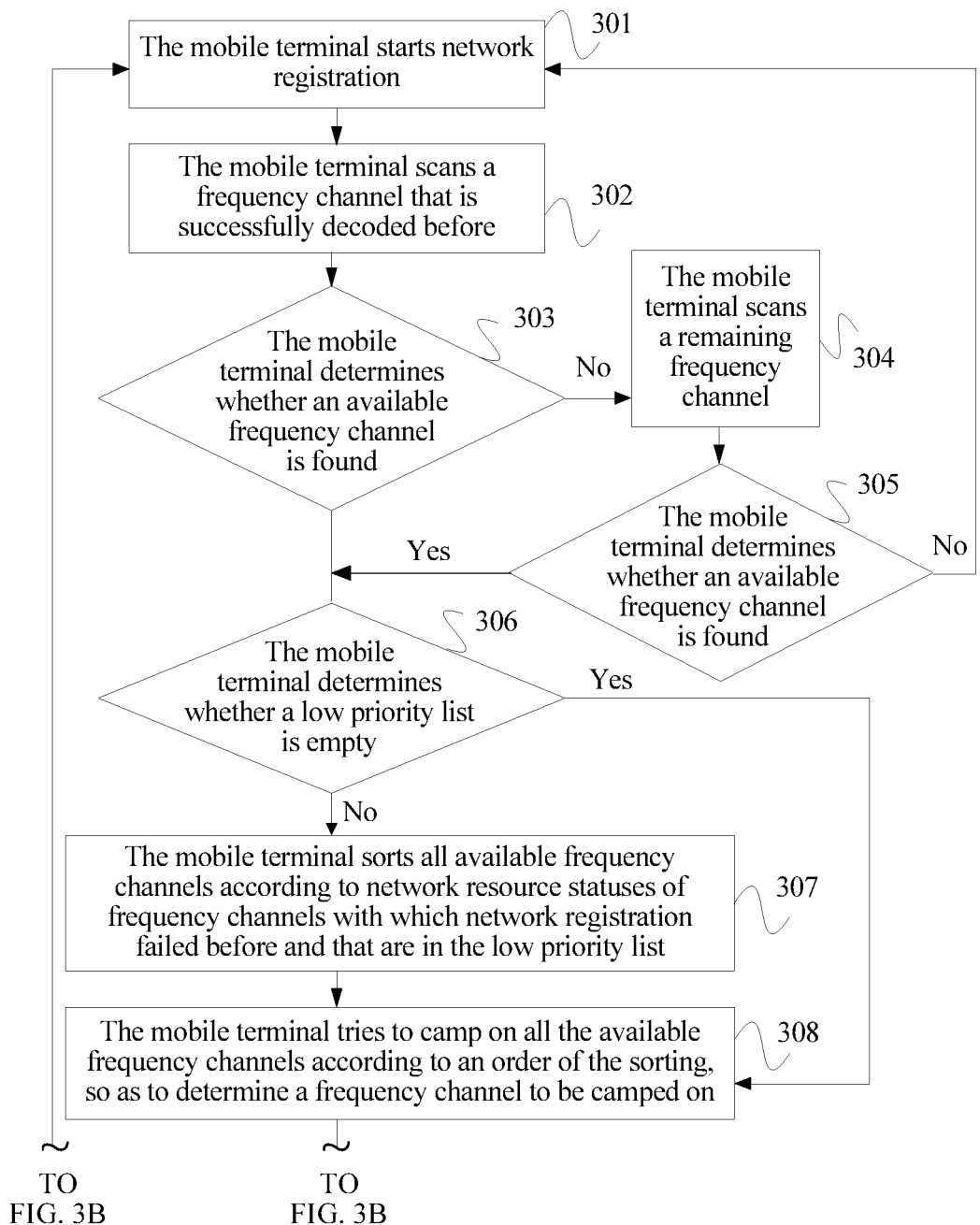
FIG. 3A and FIG. 3B are a flowchart of Embodiment 2 of a network registration manner according to the present disclosure.
Figure 3B:
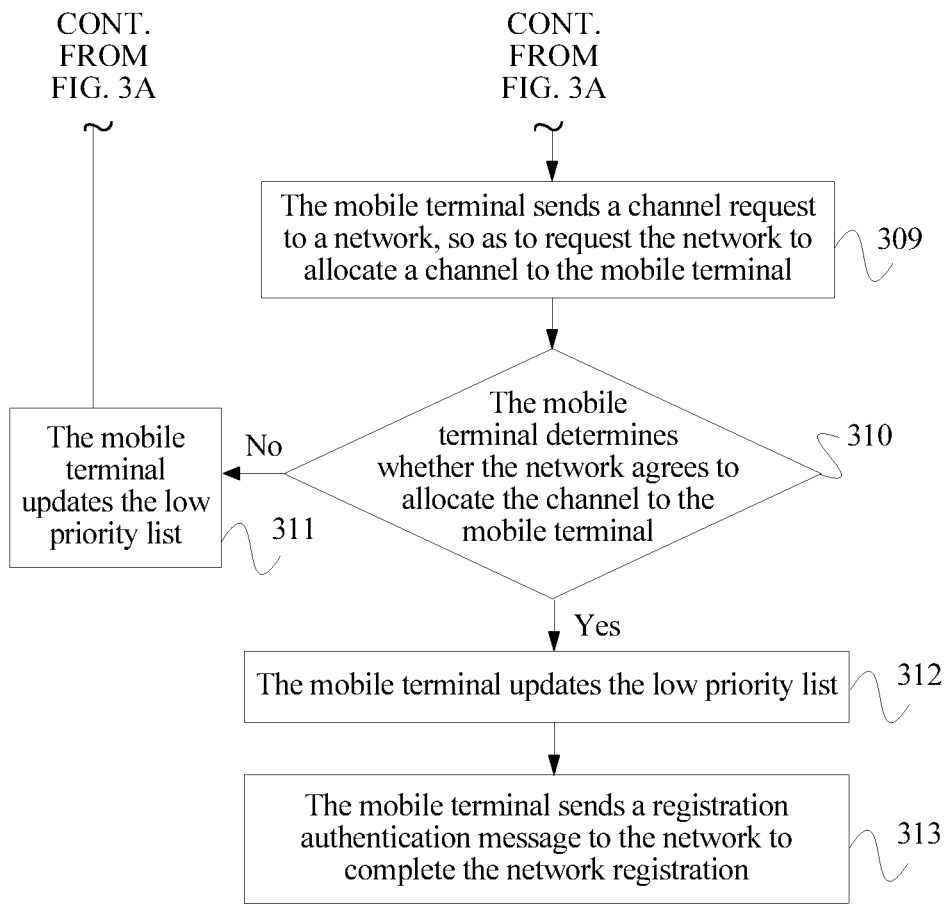

FIG. 3A and FIG. 3B are a flowchart of Embodiment 2 of a network registration manner according to the present disclosure. This embodiment describes a process from initial registration by a mobile terminal, which fails, to registration by the mobile terminal by re-selecting a frequency channel with abundant network resources. It should be understood that this embodiment of the present disclosure may include steps that are more or less than the following steps, and this embodiment of the present disclosure imposes no limitation on an order of the steps. Specifically, this embodiment includes the following steps.

Step 301. The mobile terminal starts network registration.

Step 302. The mobile terminal scans a frequency channel that is successfully decoded before.

It should be noted that, in this step, if no frequency channel information is saved in the mobile terminal, the mobile terminal performs full-frequency channel scanning on all frequency channels supported by the mobile terminal, so as to find a frequency channel that can be searched for around.

Step 303. The mobile terminal determines whether an available frequency channel is found.

The mobile terminal determines whether the available frequency channel exists in frequency channels that are obtained by means of scanning. If the available frequency channel does not exist, the mobile terminal performs step 304; if the available frequency channel exists, the mobile terminal performs step 306.

Step 304. The mobile terminal scans a remaining frequency channel.

In this step, the remaining frequency channel may be a frequency channel, except the frequency channel, that is successfully decoded before.

Step 305. The mobile terminal determines whether an available frequency channel is found.

The mobile terminal determines whether the available frequency channel exists in the remaining frequency channel. If the available frequency channel does not exist, the mobile terminal returns to step 301; if the available frequency channel exists, the mobile terminal performs step 306.

Step 306. The mobile terminal determines whether a low priority list is empty.

In this step, the mobile terminal determines whether the network resource status of the frequency channel with which network registration failed before is recorded in the low priority list. If the low priority list is empty, the mobile terminal performs step 308; if the low priority list is empty, the mobile terminal performs step 307.

Step 307. The mobile terminal sorts all available frequency channels according to network resource statuses of frequency channels with which network registration failed before and that are in the low priority list.

Step 308. The mobile terminal tries to camp on all the available frequency channels according to an order of the sorting, so as to determine a frequency channel to be camped on.

Step 309. The mobile terminal sends a channel request to a network, so as to request the network to allocate a channel to the mobile terminal.

Step 310. The mobile terminal determines whether the network agrees to allocate the channel to the mobile terminal.

Specifically, if the mobile terminal receives a channel allocation rejection message sent by the network, the mobile terminal determines that the network does not agree to allocate the channel to the mobile network, and performs step 311; if the mobile terminal receives channel information sent by the network, the mobile terminal determines that the network agrees to allocate the channel to the mobile terminal, and performs step 312.

Step 311. The mobile terminal updates the low priority list and returns to step 301.

Step 312. The mobile terminal updates the low priority list and performs step 313.

Step 313. The mobile terminal sends a registration authentication message to the network to complete the network registration.

Figure 4A:
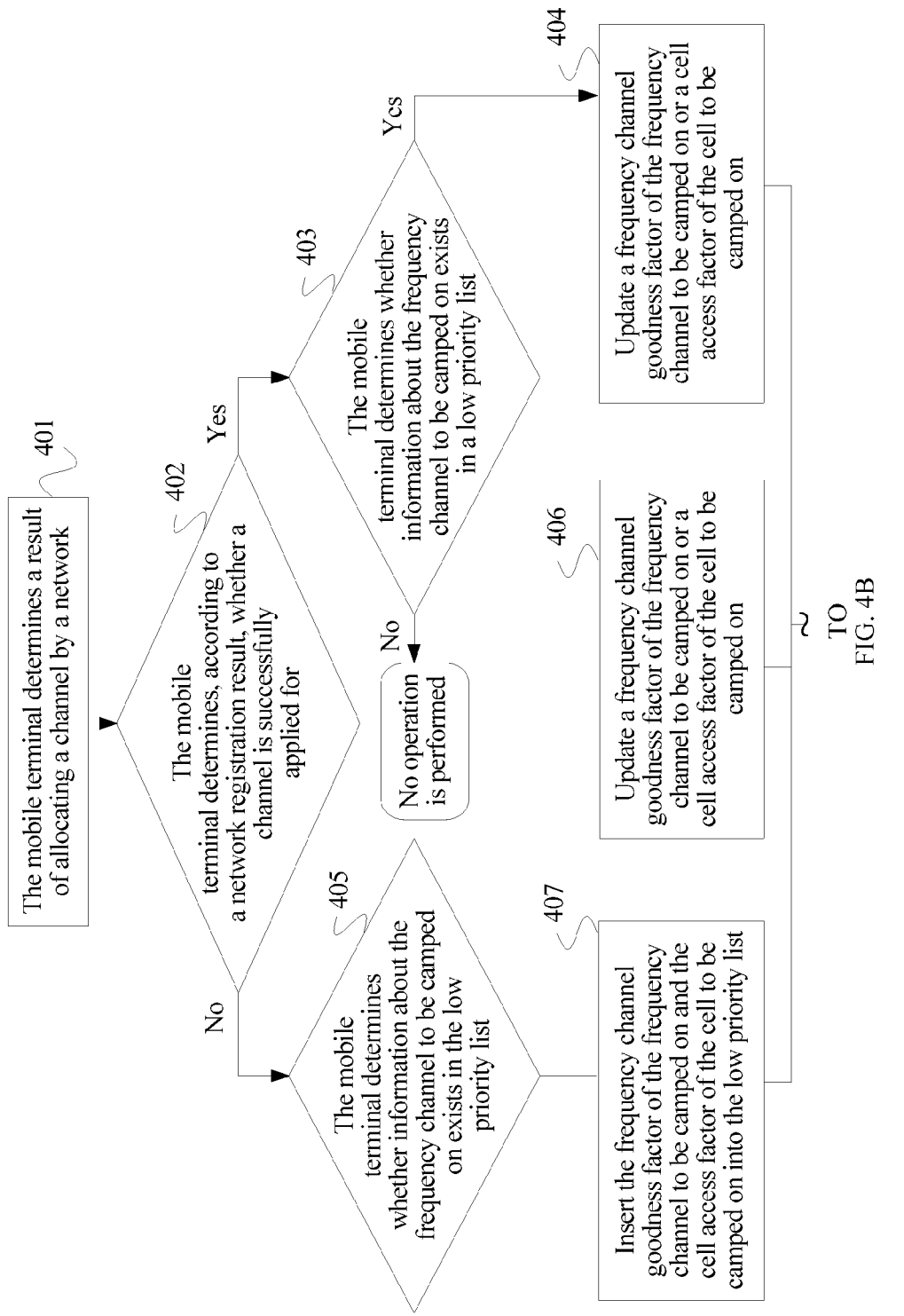
FIG. 4A and FIG. 4B are a flowchart of updating a low priority list in a network registration process according to the present disclosure.
Figure 4B:
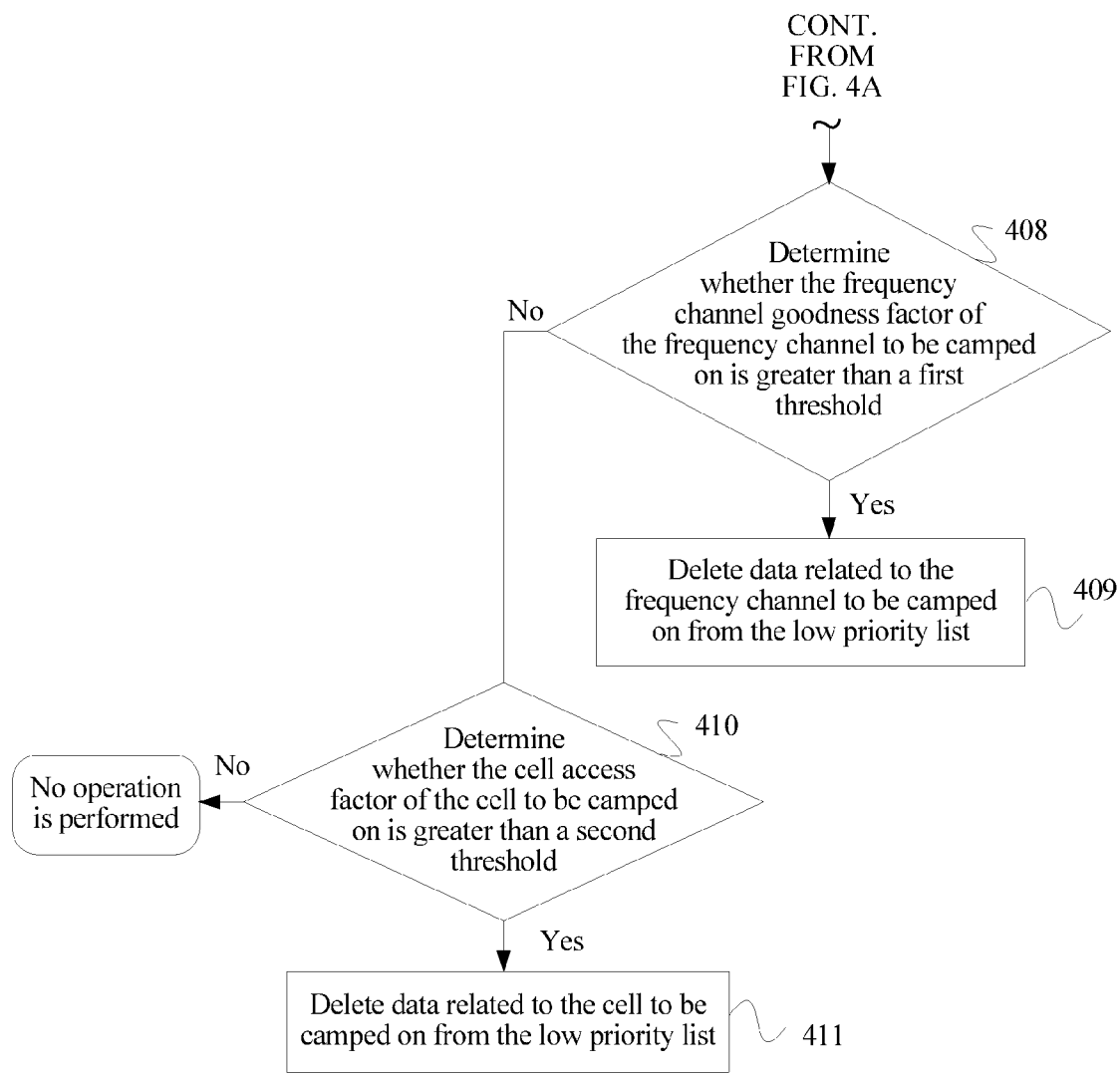

Generally, the low priority list may be saved in, for example, a running memory or a non-volatile (NV) storage area of the mobile terminal. When the low priority list is saved in the running memory, when performing power-on registration, cell reselection, or cell handover, the mobile terminal may update information saved in the running memory, and because saving is not performed in case of power cut, the low priority list is erased when the mobile terminal is powered off. When the low priority list is saved in the NV storage area, when performing initial registration, cell reselection, or cell handover, the mobile terminal may also update information saved in the NV storage area, and data is not lost in case of power cut when the mobile terminal is powered off. Therefore, data saved in the mobile terminal is wiped only when the mobile terminal is restored to factory settings. Updating the low priority list includes inserting information about a new frequency channel into the low priority list, and updating or deleting information about an existing frequency channel. Information about a frequency channel mainly includes information related to a frequency channel superiority factor of the frequency channel, and information related to cell access factors of all cells belonging to the frequency channel. The following describes in detail how to update a low priority list. Specifically, reference may be made to FIG. 4A and FIG. 4B. FIG. 4A and FIG. 4B are a flowchart of updating a low priority list in a network registration process according to the present disclosure, and the updating includes the following steps.

Step 401. The mobile terminal determines a result of allocating a channel by a network.

Step 402. The mobile terminal determines, according to a network registration result, whether a channel is successfully applied for.

Specifically, after the mobile terminal determines a frequency channel to be camped on and sends a registration message to the network, if the mobile terminal successfully applies for a channel, the mobile terminal performs step 403; if the mobile terminal does not successfully apply for a channel, the network registration fails, and the mobile terminal performs step 405.

Step 403. The mobile terminal determines whether information about the frequency channel to be camped on exists in a low priority list.

Specifically, if the mobile terminal successfully registers with a cell to be camped on that is of the frequency channel to be camped on, the mobile terminal determines whether a frequency channel superiority factor of the frequency channel to be camped on or a cell access factor of the cell to be camped on is recorded in the low priority list. If related data is recorded in the low priority list, it indicates that the frequency channel to be camped on is a frequency channel with which network registration failed before, and as time goes by, a network resource status of the frequency channel to be camped on becomes relatively abundant, and in this case, step 404 is executed to update the frequency channel superiority factor of the frequency channel to be camped on, the cell access factor of the cell to be camped on, and the like. If no data related to the frequency channel to be camped on is recorded in the low priority list, it indicates that the frequency channel to be camped on is a frequency channel with abundant resources, and the frequency channel to be camped on does not need to be recorded into the low priority list, that is, no updating operation is performed on the low priority list.

Step 404. Update a frequency channel superiority factor of the frequency channel to be camped on, a cell access factor of the cell to be camped on, and the like, and then execute step 408.

Step 405. The mobile terminal determines whether information about the frequency channel to be camped on exists in the low priority list.

Specifically, if the mobile terminal does not successfully register with a cell to be camped on that is of the frequency channel to be camped on, the mobile terminal determines whether a frequency channel superiority factor of the frequency channel to be camped on or a cell access factor of the cell to be camped on is recorded in the low priority list. If related data is recorded in the low priority list, it indicates that the frequency channel to be camped on is a frequency channel with which network registration failed before, and as time goes by, a network resource status of the frequency channel to be camped on is still limited, and in this case, step 406 is executed to update the frequency channel superiority factor of the frequency channel to be camped on, the cell access factor of the cell to be camped on, and the like. If no data related to the frequency channel to be camped on is recorded in the low priority list, it indicates that the frequency channel to be camped on is a frequency channel with a limited resource, but is not recorded in the low priority list, and in this case, step 407 is executed to insert the frequency channel to be camped on into the low priority list.

Step 406. Update the frequency channel superiority factor of the frequency channel to be camped on, the cell access factor of the cell to be camped on, and the like, and then execute step 408.

Step 407. Insert the frequency channel superiority factor of the frequency channel to be camped on, the cell access factor of the cell to be camped on, and the like, into the low priority list, and then execute step 408.

Step 408. Determine whether the frequency channel superiority factor of the frequency channel to be camped on is greater than a first threshold.

For a frequency channel to be camped on that is updated in the low priority list or a frequency channel to be camped on that is newly added, the mobile terminal determines whether the frequency channel superiority factor of the frequency channel to be camped on is greater than the first threshold. If the frequency channel superiority factor of the frequency channel to be camped on is greater than the first threshold, the mobile terminal performs step 409; if the frequency channel superiority factor of the frequency channel to be camped on is not greater than the first threshold, the mobile terminal performs step 410. The first threshold indicates a value of the frequency channel superiority factor when a network resource status of the frequency channel is good. For example, if the first threshold is 0.6, when the frequency channel superiority factor of the frequency channel to be camped on is 0.8, it indicates that a network resource of the frequency channel to be camped on is relatively good, and in this case, step 409 is executed to delete data related to the frequency channel to be camped on from the low priority list; when the frequency channel superiority factor of the frequency channel to be camped on is 0.4, it indicates that a network resource of the frequency channel to be camped on is limited, the frequency channel to be camped on needs to be retained in the low priority list, and a cell on which the mobile terminal camps may further be determined, that is, step 410 is executed.

Step 409. Delete data related to the frequency channel to be camped on from the low priority list.

Step 410. Determine whether the cell access factor of the cell to be camped on is greater than a second threshold.

After determining that the frequency channel superiority factor of the frequency channel to be camped on is not greater than the first threshold, the mobile terminal further determines a cell access capability of the cell to be camped on, where the cell to be camped on is a cell belonging to the frequency channel to be camped on. Specifically, the mobile terminal determines whether the cell access factor of the cell to be camped on is greater than the second threshold, and if the cell access factor of the cell to be camped on is greater than the second threshold, the mobile terminal performs step 411; if the cell access factor of the cell to be camped on is not greater than the second threshold, it indicates that the cell access capability of the cell is limited, and the cell to be camped on needs to be retained in the low priority list, that is, no operation is performed on the cell. The second threshold indicates a value of a cell access factor when the access capability of the cell is good.

Step 411. Delete data related to the cell to be camped on from the low priority list.

If the cell access factor of the cell to be camped on is greater than the second threshold, it indicates that the cell access capability of the cell is relatively good, and in this case, information about the cell is deleted from the low priority list.

In addition, the mobile terminal may also determine a cell access capability of another cell, except the cell to be camped on, in cells belonging to the frequency channel to be camped on; that is, for each cell belonging to the cell to be camped on, the mobile terminal determines whether the cell access factor of the cell is greater than the second threshold. If the cell access factor of the cell is greater than the second threshold, it indicates that the cell access capability of the cell is relatively good, and in this case, the information about the cell is deleted from the low priority list; if the cell access factor is not greater than the second threshold, it indicates that the cell access capability of the cell is limited, and the cell needs to be retained in the low priority list, that is, no operation is performed on the cell.

In addition, it should be noted that, in the foregoing embodiment shown in FIG. 4A and FIG. 4B, an example in which both the frequency channel superiority factor of the frequency channel and the cell access factor of the cell that are in the low priority list are updated is used to describe the present disclosure in detail. However, the present disclosure is not limited thereto. In another feasible implementation manner, updating may only be performed on the frequency channel superiority factor. That is, if the mobile terminal successfully registers with the frequency channel to be camped on, the mobile terminal determines whether the frequency channel superiority factor of the frequency channel to be camped on is recorded in the low priority list; if the frequency channel superiority factor of the frequency channel to be camped on is recorded, the frequency channel superiority factor of the frequency channel to be camped on is updated, or if the mobile terminal does not successfully register with the frequency channel to be camped on, the mobile terminal determines whether the frequency channel superiority factor of the frequency channel to be camped on is recorded in the low priority list; and if the frequency channel superiority factor of the frequency channel to be camped on is recorded, the frequency channel superiority factor of the frequency channel to be camped on is updated, or if the frequency channel superiority factor of the frequency channel to be camped on is not recorded, the frequency channel superiority factor of the frequency channel to be camped on is inserted into the low priority list.

Figure 5:
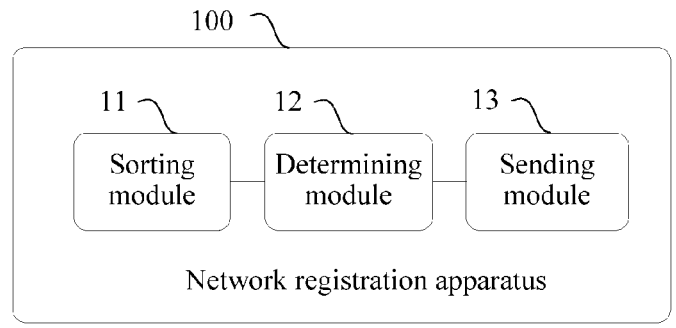
FIG. 5 is a schematic structural diagram of Embodiment 1 of a network registration apparatus according to the present disclosure.

FIG. 5 is a schematic structural diagram of Embodiment 1 of a network registration apparatus according to the present disclosure. A network registration apparatus 100 provided in this embodiment of the present disclosure may be independently disposed or be disposed in a mobile terminal. This embodiment is an apparatus embodiment corresponding to the embodiment shown in FIG. 2, and a specific implementation process is not described herein again. Specifically, the network registration apparatus 100 provided in this embodiment includes a sorting module 11 configured to sort all available frequency channels according to a pre-stored low priority list, where the low priority list stores network resource status information of a frequency channel with which network registration failed before; a determining module 12 configured to try to camp on all the available frequency channels according to an order of the sorting that is obtained by the sorting module 11, so as to determine a frequency channel to be camped on; and a sending module 13 configured to send network registration information to a network to implement registration with a cell of the frequency channel to be camped on that is determined by the determining module 12.

According to the network registration apparatus provided in this embodiment of the present disclosure, during re-registration with a network, after receiving a channel allocation rejection message sent by the network, the network registration apparatus sorts all the available frequency channels according to network resource statuses of the frequency channels with which network registration failed before and that are in the low priority list, and then tries to camp on all the available frequency channels, so as to determine a frequency channel to be camped on, and finally sends a network registration message to implement registration with the frequency channel to be camped on. In this method, after receiving the channel allocation rejection message sent by the network, the network registration apparatus records information about a corresponding frequency channel. When re-initiating network registration, the mobile terminal first performs sorting according to frequency channel information recorded by the network registration apparatus, and sorts a frequency channel with a relatively poor network resource into a low priority list, which enables the mobile terminal to preferentially select another frequency channel with a relatively good network resource to perform registration, increases a network registration success rate, and ensures reliability of a service of the mobile terminal.

Figure 6:
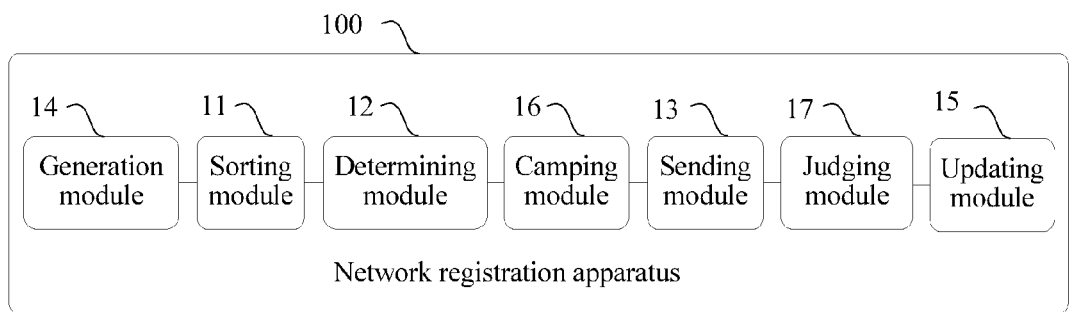
FIG. 6 is a schematic structural diagram of Embodiment 2 of a network registration apparatus according to the present disclosure.

FIG. 6 is a schematic structural diagram of Embodiment 2 of a network registration apparatus according to the present disclosure. As shown in FIG. 6, a network registration apparatus 100 in this embodiment, on the basis of the structure of the apparatus shown in FIG. 5, further includes a generation module 14 configured to store, in a network registration process and before the sorting module 11 sorts all available frequency channels according to a pre-stored low priority list, network resource status information of a frequency channel with which network registration failed before, so as to generate a low priority list.

Optionally, referring to FIG. 6 again, in an embodiment of the present disclosure, the network registration apparatus 100 further includes an updating module 15 configured to, after the sending module 13 sends a network registration message to a network to implement registration with a frequency channel to be camped on, update a low priority list.

Optionally, referring to FIG. 6 again, in an embodiment of the present disclosure, the network registration apparatus 100 further includes a camping module 16; the determining module 12 is further configured to, before the updating module 15 updates the low priority list, determine a cell to be camped on, where the cell to be camped on is a cell that has a strongest access capability in cells belonging to the frequency channel to be camped on; and the camping module 16 is configured to camp on the cell to be camped on that is determined by the determining module 12.

Optionally, referring to FIG. 6 again, in an embodiment of the present disclosure, the network registration apparatus 100 further includes a judging module 17 configured to, if registration with the cell succeeds, determine whether a frequency channel superiority factor of the frequency channel to be camped on is recorded in the low priority list, where the frequency channel superiority factor indicates a network resource status of the frequency channel; and the updating module 15 is specifically configured to, if the judging module 17 determines that the frequency channel superiority factor of the frequency channel to be camped on is recorded in the low priority list, update the frequency channel superiority factor of the frequency channel to be camped on. If registration with the cell does not succeed, the judging module 17 is configured to determine whether a frequency channel superiority factor of the frequency channel to be camped on is recorded in the low priority list, where the frequency channel superiority factor indicates a network resource status of the frequency channel; and the updating module 15 is specifically configured to, if the judging module 17 determines that the frequency channel superiority factor of the frequency channel to be camped on is recorded in the low priority list, insert the frequency channel superiority factor of the frequency channel to be camped on into the low priority list.

Optionally, in an embodiment of the present disclosure, the judging module 17 is configured to, if registration with the cell succeeds, determine whether a cell access factor of the cell to be camped on is recorded in the low priority list, where the cell access factor indicates an access capability of the cell; and the updating module 15 is configured to, if the judging module 17 determines that the cell access factor of the cell to be camped on is recorded in the low priority list, update the cell access factor of the cell to be camped on.

If registration with the cell does not succeed, the judging module 17 determines whether a cell access factor of the cell to be camped on is recorded in the low priority list; and the updating module is specifically configured to, if the judging module determines that the cell access factor of the cell to be camped on is recorded in the low priority list, update the cell access factor of the cell to be camped on, or if the cell access factor of the cell to be camped on is not recorded, insert the cell access factor of the cell to be camped on into the low priority list.

Optionally, in an embodiment of the present disclosure, the judging module 17 is further configured to determine whether an updated frequency channel superiority factor of the frequency channel to be camped on is greater than a first threshold; and the updating module 15 is further configured to, if the judging module 17 determines that the updated frequency channel superiority factor of the frequency channel to be camped on is greater than the first threshold, delete information about the frequency channel to be camped on from the low priority list, where the first threshold indicates a value of the frequency channel superiority factor when the network resource status of the frequency channel is good.

Optionally, in an embodiment of the present disclosure, the judging module 17 is further configured to determine whether an updated cell access factor of the cell is greater than a second threshold; and the updating module 15 is further configured to, if the judging module 17 determines that the updated cell access factor of the cell is greater than the second threshold, delete information about the cell from the low priority list, where the second threshold indicates a value of the cell access factor when the access capability of the cell is good.

Figure 7:
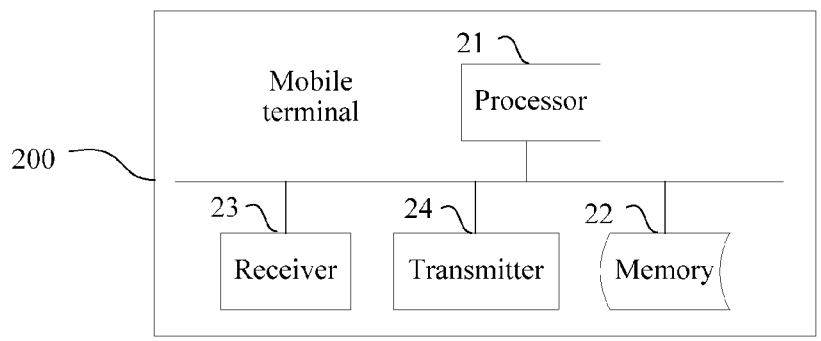
FIG. 7 is a schematic structural diagram of a mobile terminal according to the present disclosure.

FIG. 7 is a schematic structural diagram of a mobile terminal according to the present disclosure. As shown in FIG. 7, a mobile terminal 200 provided in this embodiment includes a processor 21 and a memory 22. The mobile terminal 200 may further include a transmitter 24 and a receiver 23. The transmitter 24 and the receiver 23 may be connected to the processor 21. The transmitter 24 is configured to send data or information. The receiver 23 is configured to receive data or information. The memory 22 stores an executable instruction. When the mobile terminal 200 runs, the processor 21 communicates with the memory 22. The processor 21 invokes the executable instruction in the memory 22 to execute the method embodiment shown in FIG. 2; the implementation principles and technical effects thereof are similar, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A network registration method, comprising:
sorting, by a mobile terminal, all available frequency channels according to a pre-stored low priority list, wherein the low priority list stores network resource status information of a frequency channel with which network registration failed before, wherein a priority of a frequency channel stored in the low priority list is lower than a priority of a frequency channel not stored in the low priority list;
trying, by the mobile terminal, to camp on all the available frequency channels according to an order of the sorting, so as to determine a frequency channel to be camped on;
sending, by the mobile terminal, a network registration message to a network to register with the frequency channel to be camped on;
determining, by the mobile terminal, whether a frequency channel superiority factor of the frequency channel to be camped on is recorded in the low priority list when registration with the frequency channel to be camped on succeeds; and
updating, by the mobile terminal, the frequency channel superiority factor of the frequency channel to be camped on when the frequency channel superiority factor of the frequency channel to be camped on is recorded.

2. The method according to claim 1, wherein before sorting all available frequency channels, the method further comprises storing by the mobile terminal, in a network registration process, the network resource status information of a frequency channel with which network registration failed before in the low priority list.

3. The method according to claim 1, wherein before determining whether the frequency channel superiority factor of the frequency channel to be camped on is recorded in the low priority list, the method further comprises:
determining, by the mobile terminal, a cell to be camped on, wherein the cell to be camped on is a cell that has a strongest access capability in cells belonging to the frequency channel to be camped on; and
camping, by the mobile terminal, on the cell to be camped on.

4. The method according to claim 3, further comprising:
determining, by the mobile terminal, whether a cell access factor of the cell to be camped on is recorded in the low priority list when registration with the cell to be camped on succeeds, wherein the cell access factor indicates an access capability of the cell; and
updating, by the mobile terminal, the cell access factor of the cell to be camped on when the cell access factor of the cell to be camped on is recorded.

5. The method according to claim 4,
further comprising inserting, by the mobile terminal, the cell access factor of the cell to be camped on into the low priority list when the cell access factor of the cell to be camped on is not recorded.

6. The method according to claim 4, further comprising:
determining, by the mobile terminal, whether an updated cell access factor of the cell to be camped on is greater than a second threshold; and
deleting, by the mobile terminal, information about the cell to be camped on from the low priority list when the updated cell access factor is greater than the second threshold, wherein the second threshold indicates a value of the cell access factor when the access capability of the cell is good.

7. The method according to claim 1,
further comprising inserting, by the mobile terminal, the frequency channel superiority factor of the frequency channel to be camped on into the low priority list when the frequency channel superiority factor of the frequency channel to be camped on is not recorded, wherein the frequency channel superiority factor indicates a network resource status of a frequency channel.

8. The method according to claim 1, further comprising:
determining, by the mobile terminal, whether an updated frequency channel superiority factor of the frequency channel to be camped on is greater than a first threshold; and
deleting, by the mobile terminal, information about the frequency channel to be camped on from the low priority list when the updated frequency channel superiority factor is greater than the first threshold, wherein the first threshold indicates a value of the frequency channel superiority factor when a network resource status of the frequency channel is good.

9. A mobile terminal, comprising at least one processor and a non-transitory computer readable medium coupled to the at least one processor, wherein the processor is configured to execute one or more applications in a background, and the non-transitory computer readable medium is configured to store program codes which, when executed by the processor, cause the processor to:
sort all available frequency channels according to a pre-stored low priority list, wherein the low priority list stores network resource status information of a frequency channel with which network registration failed before, wherein a priority of a frequency channel stored in the low priority list is lower than a priority of a frequency channel not stored in the low priority list;
try to camp on all the available frequency channels according to an order of the sorting, so as to determine a frequency channel to be camped on;
send a network registration message to a network to register with the frequency channel to be camped on;
determine whether a frequency channel superiority factor of the frequency channel to be camped on is recorded in the low priority list when registration with the frequency channel to be camped on succeeds; and
update the frequency channel superiority factor of the frequency channel to be camped on when the frequency channel superiority factor of the frequency channel to be camped on is recorded.

10. The mobile terminal according to claim 9, wherein before the sorting, the program codes further cause the processor to store, in a network registration process, the network resource status information of a frequency channel with which network registration failed before in the low priority list.

11. The mobile terminal according to claim 9, wherein before determining whether the frequency channel superiority factor of the frequency channel to be camped on is recorded in the low priority list, the program codes further cause the processor to:

determine a cell to be camped on, wherein the cell to be camped on is a cell that has a strongest access capability in cells belonging to the frequency channel to be camped on; and camp on the cell to be camped on.

12. The mobile terminal according to claim 11, wherein the program codes further cause the processor to:

determine whether a cell access factor of the cell to be camped on is recorded in the low priority list when registration with the cell to be camped on succeeds, wherein the cell access factor indicates an access capability of the cell; and update the cell access factor of the cell to be camped on when the cell access factor of the cell to be camped on is recorded.

13. The mobile terminal according to claim 12, wherein the program codes further cause the processor to:

determine whether an updated cell access factor of the cell to be camped on is greater than a second threshold; and delete information about the cell to be camped on from the low priority list when the updated cell access factor is greater than the second threshold, wherein the second threshold indicates a value of the cell access factor when the access capability of the cell is good.

14. The mobile terminal according to claim 11, wherein the program codes further cause the processor to:

determine whether a cell access factor of the cell to be camped on is recorded in the low priority list when registration with the cell to be camped on does not succeed;

update the cell access factor of the cell to be camped on when the cell access factor of the cell to be camped on is recorded; and insert the cell access factor of the cell to be camped on into the low priority list when the cell access factor of the cell to be camped on is not recorded.

15. The mobile terminal according to claim 9, wherein the program codes further cause the processor to insert the frequency channel superiority factor of the frequency channel to be camped on into the low priority list when the frequency channel superiority factor of the frequency channel to be camped on is not recorded, and wherein the frequency channel superiority factor indicates a network resource status of a frequency channel.

16. The mobile terminal according to claim 9, wherein the program codes further cause the processor to:

determine whether an updated frequency channel superiority factor of the frequency channel to be camped on is greater than a first threshold; and delete information about the frequency channel to be camped on from the low priority list when the updated frequency channel superiority factor is greater than the first threshold, wherein the first threshold indicates a value of the frequency channel superiority factor when a network resource status of the frequency channel is good.

* * * * *